United States Patent Office 3,164,599
Patented Jan. 5, 1965

3,164,599
BIS-NITROGEN HETEROCYCLIC COMPOUNDS
AND A METHOD OF THEIR PREPARATION
Henry Rapoport, Berkeley, Calif., assignor to California
Research Corporation, San Francisco, Calif., a corporation of Delaware
No Drawing. Filed Nov. 28, 1960, Ser. No. 71,887
4 Claims. (Cl. 260—288)

This invention relates to a process for preparing bis-nitrogen heterocyclic compounds from pyridine, quinoline, pyrrole, and related materials. In particular, the process of the invention pertains to the reaction of nitrogen heterocyclic compounds in the presence of a palladium catalyst to form the corresponding bis-nitrogen heterocyclic compounds.

Bis-nitrogen heterocyclic compounds of the invention are of particular interest in the chemical industry as a result of their unique properties as complexing agents for copper and other metallic ions. Their sensitivity permits detection of copper in concentrations as low as one part in one-hundred million. Certain of the compounds are also valuable chemical intermediates.

Heretofore, the yields obtained from methods of the prior art for the preparation of these bis-nitrogen heterocycles, such as 2,2'-biquinolyls, have been quite poor. For example, one method of preparation of 2,2'-biquinolyl by the condensation of an o-aminobenzaldehyde or an o-aminophenone with a 2-acylquinoline requires the laborious preparation of intermediates and still provides only very poor yields. Other methods have been used, but they too require the preparation of intermediates and give extremely poor yields. In the preparation of 2,2'-biquinolyl by methods of the prior art, a yield of 5 percent is considered high.

It has now been discovered that various bis-nitrogen heterocyclic compounds such as 2,2'-biquinolyl, 2,2'-bipyridyl, or 2,2'-bipyrrole may be simply and effectively prepared by heating quinoline, pyridine, or pyrrole, respectively, at reflux temperature, i.e., between about 110 to 400° C., in the presence of a palladium catalyst. In cases however, where the reflux temperature is above that at which products or reactants tend to decompose, an inert diluent may be used to lower the reflux temperature of the system below the decomposition temperature. On the other hand, moreover, if the reflux temperature of the starting material is too low to provide a reasonable reaction rate, a high-boiling diluent or super-atmospheric pressure may be used to sufficiently increase the temperature of reflux and, accordingly, the reaction rate. A conversion of 2,2'-biquinolyl of as high as 17 percent per pass in comparison with 5 percent by the better methods of the prior art may be obtained by the process of the invention. Still another advantage of the invention is the fact that a major proportion of the starting materials which are not converted to the bis-nitrogen heterocyclic compounds remains unaffected by the catalyst and hence may be recovered and recycled so as to obtain an over-all yield of the desired bis-nitrogen heterocycle based on starting material consumed of as high as 70 to 90 percent.

The heterocyclic nitrogen starting materials for the process of the invention can be certain quinolines, naphthyridines, pyridines, pyrroles, and similar heterocycles. In addition, 2-methylquinoline may be converted to 1,2-di-2-quinolylethane by the process of the invention. These materials may be unsubstituted or may have lower alkyl, lower alkoxy, or phenyl substituents on any available ring positions above three. For example, the compound quinoline, having the following structural formula

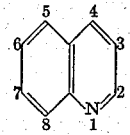

is itself a suitable material for the process of the invention, or it may have substituents in the 4, 5, 6, 7, or 8 positions.

From starting materials of the invention which are unsubstituted in the 2 position, the bis-compound is formed by a direct linkage at the 2 position. For example, quinoline forms 2,2'-biquinolyl, represented:

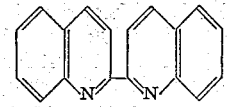

In the case of 2-methylquinolines, the bis-nitrogen heterocyclic compounds formed therefrom are joined by their 2-methyl groups. 2-methylquinoline forms the compound 1,2-di-2-quinolylethane, structurally represented as follows:

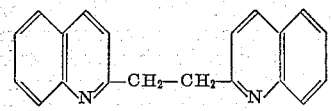

The process of the invention, in more detail, is as follows. The heterocyclic nitrogen starting material is heated under reflux in the presence of a palladium catalyst. The amount of catalyst used and the precise type are not critical. From 5 to 20 percent of a supported catalyst by weight of reaction mixture has been found suitable, about 10 percent being preferred. The catalyst may be any conventional supported palladium hydrogenation catalyst. For example, commercially available 5 or 10 percent palladium-on-carbon catalysts are satisfactory. The mixture is heated until it has been ascertained that the reaction is no longer taking place, a time of approximately 24 hours being considered satisfactory.

After the reaction has ceased, the mixture is cooled and admixed with about 10 parts of a solvent, such as chloroform or carbon tetrachloride. The mixture is then heated to boiling and filtered. If desired, the catalyst can be rewashed with a boiling solvent, such as chloroform, carbon tetrachloride, or benzene, to remove all adsorbed material therefrom. These washing solutions are combined with the reaction mixture so that solvent may be removed from the entire mixture in one operation by an extractive distillation. Where the starting material is sufficiently volatile to permit its separation from the product by distillation, the starting material may be recovered overhead, leaving product as bottoms. In those instances where the starting material is not sufficiently volatile to be separated from the product by distillation, it may be separated by sublimation or by chromatography on an alumina column.

The reaction may be carried out under atmospheric conditions or, if desired, may be carried out in the absence of oxygen, such as under a $CO_2$ atmosphere.

The advantages and details of the invention can perhaps be better understood by a reference to the following examples. However, these examples are merely intended to be illustrative and are not to be considered as further limitations upon the scope of the invention.

EXAMPLE 1

Quinoline was stirred and heated under reflux at about 238° C. in the presence of 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to recover the unreacted starting material.

The residue from the distillation was purified by chromatography on an alumina column. A solid was obtained which melted at 196° C. This was a 17-percent conversion of quinoline to 2,2'-biquinolyl. Unreacted quinoline was recovered, showing an 85-percent yield based upon quinoline consumed.

EXAMPLE 2

Pyridine was stirred and heated under reflux at about 115° C. in the presence of 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to recover the unreacted starting material.

The residue from the distillation was purified by chromatography on an alumina column. A solid was obtained which melted at 70 to 71° C. and was analyzed to be 2,2'-bipyridyl.

EXAMPLE 3

8-methylquinoline was stirred and heated under reflux at about 247 to 258° C. in the presence of a 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to recover the unreacted starting material.

The residue from the distillation was purified by chromatography on an alumina column. A solid was obtained which melted at 210 to 211° C. and was analyzed to be 8,8'-dimethyl-2,2'-biquinolyl.

EXAMPLE 4

4-phenylquinoline was stirred and heated at about 360° C. in the presence of 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to recover the unreacted starting material.

The residue from the distillation was purified by chromatography on an alumina column. A solid was obtained which melted at 358 to 360° C. and then analyzed to be 4,4'-diphenyl-2,2'-biquinolyl.

EXAMPLE 5

Pyrrole was stirred and heated at about 131° C. in the presence of 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to recover the unreacted starting material.

The residue from the distillation was purified by chromatography on an alumina column. A solid was obtained which melted at 187° C. and then analyzed to be 2,2'-bipyrrole.

EXAMPLE 6

6-methoxyquinoline was stirred and heated at about 265° C. in the presence of 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to recover the unreacted starting material.

The residue from the distillation was purified by treatment by chromatography on an alumina column. A solid was obtained which melted at 280 to 281° C. and was analyzed to be 6,6'-dimethoxy-2,2'-biquinolyl.

*Analysis*

| Element | Theory | Found |
|---|---|---|
| C | 76.0 | 75.9 |
| H | 5.1 | 5.0 |
| N | 8.9 | 9.1 |
| $OCH_3$ | 19.6 | 19.5 |

EXAMPLE 7

1,5-naphthyridine was stirred and heated under reflux at about 220° C. in the presence of 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to recover the unreacted starting material.

The residue from the distillation was purified by chromatography on an alumina column. A solid was obtained which melted at 282 to 284° C. and was analyzed to be 2,2'-bi-1,5-naphthyridyl.

*Analysis*

| Element | Theory | Found |
|---------|--------|-------|
| C       | 74.4   | 74.7  |
| H       | 3.9    | 3.7   |
| N       | 21.7   | 21.8  |

EXAMPLE 8

4,6-dimethylpyridine was stirred and heated under reflux at about 157° C. in the presence of 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to recover the unreacted starting material.

The residue from the distillation was purified by chromatography on an alumina column. A solid was obtained which melted at 144 to 145° C. and was analyzed to be 4,4',6,6'-tetramethyl-2,2'-bipyridyl.

*Analysis*

| Element | Theory | Found |
|---------|--------|-------|
| C       | 79.3   | 79.3  |
| H       | 7.5    | 7.5   |
| N       | 13.2   | 13.2  |

EXAMPLE 9

2-methylquinoline was stirred and heated under reflux at about 246 to 247° C. in the presence of 10 percent by weight of a 5 percent palladium-on-carbon catalyst for about 24 hours. The mixture was then cooled, 10 parts by volume chloroform were added, and the resulting mixture heated to boiling and filtered. Any product or unreacted starting material adsorbed on the catalyst was removed by subsequent digestions of the catalyst with chloroform. This chloroform solution was admixed with the original solution containing the product and the remainder of the unreacted starting material. The combined chloroform solution was first distilled to remove chloroform and then further distilled to remove the unreacted starting material.

The residue from the distillation was purified by chromatography on an alumina column. A solid was obtained which melted at 166 to 167° C. and was analyzed to be 1,2-di-2-quinolylethane.

*Analysis*

| Element | Theory | Found |
|---------|--------|-------|
| C       | 84.4   | 84.4  |
| H       | 5.6    | 5.6   |
| N       | 9.9    | 9.9   |

As will be evident to those skilled in the art, various modifications on this process can be made or followed, in the light of the foregoing disclosure and discussion, without departing from the spirit or scope of the disclosure or from the scope of the claims.

I claim:

1. A process for preparing bis-nitrogen heterocyclic compounds selected from the class consisting of 2,2'-biquinolyl, 2,2'-binaphthyridyl, 2,2' - bipyridyl, 1,2 - di - 2 - quinolylethane, 2,2'-bipyrrole, and substituted members thereof which comprises heating at reflux temperature in the presence of a palladium hydrogenation catalyst a compound possessing a boiling point between about 110°–400° C. selected from the class consisting of quinoline, naphthyridine, pyridine, 2-methylquinoline, pyrrole, and substituted members thereof, said substitutents being located on ring positions above 3 and being selected from the class consisting of lower alkyl, lower alkoxy, and phenyl.

2. A process according to claim 1, wherein the catalyst is palladium-on-carbon.

3. A process for preparing 2,2'-biquinolyl which comprises heating quinoline at reflux in the presence of a palladium hydrogenation catalyst.

4. 2,2'-bi-1,5-naphthyridyl.

References Cited in the file of this patent

UNITED STATES PATENTS

Hammick et al.: J. Chem. Soc., pp. 2436–41 (1955).
Badger et al.: J. Chem. Soc., pp. 616–620 (1956).
Linnell: J. Organic Chem., vol. 22, pp. 1691–92 (1957).
Nakano: Pharmaceutical Society of Japan (Journal), vol. 79, pp. 310–319 (1959).
Rapoport et al.: J. Organic Chem., vol. 25, pp. 372–373 (1960).